US009495143B2

(12) United States Patent
Mellor et al.

(10) Patent No.: US 9,495,143 B2
(45) Date of Patent: *Nov. 15, 2016

(54) EXTERNAL PLATFORM EXTENSIONS IN A MULTI-TENANT ENVIRONMENT

(71) Applicant: Oracle International Corporation, Redwood Shores, CA (US)

(72) Inventors: David R. Mellor, Lynnfield, MA (US); Andrew H. Jones, Newtown, CT (US); Charles Lattimer, Danbury, CT (US)

(73) Assignee: Oracle International Corporation, Redwood Shores, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/032,474

(22) Filed: Sep. 20, 2013

(65) Prior Publication Data

US 2015/0033365 A1 Jan. 29, 2015

Related U.S. Application Data

(60) Provisional application No. 61/858,476, filed on Jul. 25, 2013.

(51) Int. Cl.
| | |
|---|---|
| *G06F 21/62* | (2013.01) |
| *G06F 9/445* | (2006.01) |
| *H04L 12/24* | (2006.01) |
| *H04L 29/06* | (2006.01) |
| *H04L 29/08* | (2006.01) |

(Continued)

(52) U.S. Cl.
CPC . *G06F 8/65* (2013.01); *G06F 8/71* (2013.01); *G06F 17/30073* (2013.01); *G06F 17/30292* (2013.01); *G06F 17/30923* (2013.01); *G06F 21/62* (2013.01); *H04L 41/0803* (2013.01); *H04L 63/101* (2013.01); *H04L 63/102* (2013.01); *H04L 67/1002* (2013.01); *G06F 8/68* (2013.01); *G06F 9/44505* (2013.01)

(58) Field of Classification Search
CPC .................................................. G06F 21/62
See application file for complete search history.

(56) References Cited

U.S. PATENT DOCUMENTS

| | | | |
|---|---|---|---|
| 8,805,971 | B1 | 8/2014 | Roth et al. |
| 9,294,482 | B2 | 3/2016 | Mellor |

(Continued)

OTHER PUBLICATIONS

Guo et al., "A Framework for Native Multi-Tenancy Application Development and Management", 2007, 8 pages.*

(Continued)

*Primary Examiner* — Taghi Arani
*Assistant Examiner* — Thaddeus Plecha
(74) *Attorney, Agent, or Firm* — Kilpatrick Townsend & Stockton LLP

(57) ABSTRACT

Enforcing access control to individual extensions of services in a multi-tenant cloud environment by initializing objects for the extension based on public and private configuration files with service access rules that are merged is described. This allows third party vendors to specify payment rules for their own extensions while securely keeping the core extension configuration files. Tenants of the multi-tenant cloud environment can pick and choose which services to purchase, and the cloud environment automates the process of accessing the service using the third-party developer's tenant access list rules.

19 Claims, 14 Drawing Sheets

(51) Int. Cl.
*G06F 17/30* (2006.01)
*G06F 9/44* (2006.01)

(56) References Cited

U.S. PATENT DOCUMENTS

| | | |
|---|---|---|
| 2003/0163727 A1 | 8/2003 | Hammons et al. |
| 2004/0044622 A1* | 3/2004 | Blott et al. ....................... 705/40 |
| 2005/0055575 A1 | 3/2005 | Evans et al. |
| 2005/0289534 A1 | 12/2005 | Kim et al. |
| 2006/0012393 A1* | 1/2006 | Raju Datla et al. ............. 326/39 |
| 2007/0169097 A1 | 7/2007 | Al Saadi et al. |
| 2007/0196808 A1* | 8/2007 | Call ............................... 434/350 |
| 2007/0237093 A1 | 10/2007 | Rajagopalan et al. |
| 2007/0294669 A1* | 12/2007 | Robalewski et al. ......... 717/120 |
| 2008/0254840 A1* | 10/2008 | Kano et al. ................... 455/566 |
| 2009/0204943 A1* | 8/2009 | Konduri .................... G06F 8/51 717/114 |
| 2009/0217382 A1* | 8/2009 | Lecheler ............. H04L 63/1416 726/26 |
| 2009/0217384 A1* | 8/2009 | Etchegoyen .................... 726/26 |
| 2009/0222493 A1* | 9/2009 | Smarr et al. ................... 707/203 |
| 2010/0175112 A1 | 7/2010 | Loeb et al. |
| 2010/0186078 A1* | 7/2010 | Napoli et al. ...................... 726/9 |
| 2010/0223297 A1 | 9/2010 | Li et al. |
| 2011/0016477 A1* | 1/2011 | Schechter et al. ............ 719/330 |
| 2011/0093913 A1 | 4/2011 | Wohlert et al. |
| 2011/0191299 A1 | 8/2011 | Huynh Huu et al. |
| 2012/0159572 A1 | 6/2012 | Patel et al. |
| 2012/0179587 A1* | 7/2012 | Hill et al. ........................ 705/34 |
| 2012/0198221 A1 | 8/2012 | Tukol et al. |
| 2013/0041872 A1* | 2/2013 | Aizman et al. ................ 707/690 |
| 2013/0091195 A1* | 4/2013 | Gordon et al. ................ 709/203 |
| 2013/0117424 A1* | 5/2013 | Colyer et al. ................. 709/221 |
| 2013/0218854 A1 | 8/2013 | Mungi |
| 2013/0247219 A1 | 9/2013 | Park |
| 2013/0325826 A1 | 12/2013 | Agarwal et al. |
| 2014/0013006 A1* | 1/2014 | Schillinger ............... G06F 8/68 709/247 |
| 2016/0139911 A1 | 5/2016 | Mellor |

OTHER PUBLICATIONS

Khan et al., Access Control in Cloud Computing Environment, ARPN Journal of Engineering and Applied Sciences, vol. 7, No. 5, 2012, pp. 613-615.

Park, Secure Data Access Control Scheme Using Type-Based Re-encryption in Cloud Environment, Semantic Methods, vol. 381, 2011, pp. 319-327.

Stegeman, Building Customizable Applications Using Oracle Metadata Services (II), downloaded from the Internet on Jun. 28, 2015 from http://www.oracle.com/technetwork!articles/adf/part9-169243.html, May 2010, pp. 1-12.

Yu et al., Achieving Secure, Scalable, and Fine-grained Data Access Control in Cloud Computing, IEEE Infocom 2010 proceedings, 2010, pp. 1-9.

U.S. Appl. No. 14/016,582, Non-Final Office Action mailed on Jul. 8, 2015, 26 pages.

U.S. Appl. No. 14/016,582, Notice of Allowance mailed on Oct. 28, 2015, 11 pages.

* cited by examiner

```xml
<?xml version="1.0" encoding="ISO-8859-1"?>

<providers xmlns:xsi="http://www.w3.org/2001/XMLSchema-instance"
xsi:noNamespaceSchemaLocation="BlakeProviders.xsd"
    <config>
        <name>BlakeCore1</name>
        <type>      ... </type>
        <factory>   ... </factory>
        <method>    ... </method>
    </config>
    <config>
        <name>BlakeCore2</name>
        <type>      ... </type>
        <factory>   ... </factory>
        <method>    ... </method>
    </config>
    <config>
        <name>MyAddIn</name>
        <type>      ... </type>
        <factory>   ... </factory>
        <method>    ... </method>
    </config>
</providers>
```

510 — (points to top of XML)
408 — (points to MyAddIn config block)

MERGED CONFIG FILE

FIG. 5

EXTERNAL PLATFORM EXTENSIONS IN A MULTI-TENANT ENVIRONMENT

CROSS-REFERENCES TO RELATED APPLICATIONS

This application claims the benefit of U.S. Provisional Application No. 61/858,476, filed Jul. 25, 2013, which is hereby incorporated by reference in its entirety for all purposes.

This application is related to U.S. application Ser. No. 14/016,582, filed Sep. 3, 2013, which is hereby incorporated by reference in its entirety for all purposes.

BACKGROUND

1. Field of the Art

Generally, the present application relates to data processing. Specifically, the application is related to self-metering third-party services provided in a cloud computing environment.

2. Discussion of the Related Art

Cloud computing is a model for enabling convenient, on-demand network access to a shared pool of configurable computing resources. These resources can include network connections, server processing power, storage, applications, services, and other resources in demand.

Many terms in cloud computing have either sprouted anew or taken on additional meaning as the concept of relying on an outside party with an offsite computer to store and process one's data becomes acceptable and more popular with businesses and the general public.

A "service" includes an autonomous unit of functionality in software representing a single action. A service provides interaction via a prescribed input and output protocol. Services can be built from a software component or series of components; however, services generally cannot embed other services within them.

A "component" includes a modular part of a software system that encapsulates its content and whose manifestation is replaceable within its environment. A component can define its behavior in terms of provided and required interfaces. Multiple components can be combined together to form aggregated portions of a system or other components.

A "tool" includes a grouping of components with a user-facing mechanism to perform a task.

A "package" includes a logical grouping of software elements to provide a namespace for the grouped elements. A package may contain other packages, thus providing for a hierarchical organization of packages. Packages typically contain elements from a single layer of an architecture.

A "sub-system" includes a grouping of elements to provide a physical implementation structure. A sub-system may contain other sub-systems. A sub-system is typically a manifestation of a package or packages associated with a physical system.

A "multi-tenant environment" includes a computing environment in which a single instance of a software application or software services runs on a server that concurrently executes for multiple client organizations (i.e., tenants). Such an environment keeps each client organization's variables separate, even when processing time and memory space are shared.

Multi-tenant cloud computing environments are typically set up by well capitalized companies with many resources. Among those resources are many software developers, network administrators, etc. who maintain and update the software services and applications that run on the cloud network. Complex, polished software suitable for mass use by customers of the cloud computing environment is the product of many internal employees' research, time, and labor.

More sophisticated cloud computing environments allow third-party developers to create plug-ins or other services for the applications running on the cloud network. Third-party developers are typically hired by the cloud computing companies to provide and update the third-party services, which are in turn used by tenant customers of the cloud service. The cloud service charges customers for the use of the service, centralizing control over who can and cannot access each service. The third-party developers and customers of the cloud network are essentially isolated from one another.

There is a need in the art for better, more efficient, and customizable cloud computing services that are scalable for large enterprises.

BRIEF SUMMARY

Generally, what is described is a multi-tenant cloud application that includes services developed by third party developers that tend their own access lists for their services. The tenant access lists and payments are arranged by the third party developers so that developers can charge for services in a finer manner than the all-or-nothing, cloud managed services of the prior art. Access can be automated through tenant access list rules that are submitted directly by the third-party developers to the cloud environment as part of a software package.

Once a software package is uploaded, the cloud's application server is restarted with a config file that has been merged with a delta file (of a 'blank' config file) populated by a third party developer for its add-in or service. The merging safely adds the third-party developer's configs to the master configuration file so that the software service can execute on the cloud, without having to expose parts of the config file that are internal to the cloud services provider. The merged config file ensures that the third-party's services are loaded in the server for everyone; however, the third-party developer's tenant access list rules block those who are not subscribers from accessing the services.

The config file can be an extensible markup language (XML) file compliant with an XML schema defined in an XSD file. The XSD schema file can specify or otherwise define elements, child elements, and attributes of the elements.

Given a 'blank' version of an XML configuration file from the cloud service provider, that is, a version of the XML configuration file with no configs or child elements in it, a third party developer or other programmer can populate the XML config file with elements concerning his or her third party extension. The third party developer's XML configuration file is treated as a delta file, showing 'changes' by the third party developer to the config file.

The third-party developer can place the delta file in a MAR (metadata archive) with JAR (Java archive) files for the third party extension and included in an Oracle metadata services (MDS) customization file. The MDS customization file is then sent back to the cloud service provider and put in a shared library of class files. This shared library is the same library that the cloud provider uses for its own files. A base config file is merged with the layered customization MAR file automatically by MDS.

Upon a restart of the cloud server, the various configuration files in the shared library—including the delta file—are automatically merged together in a unified configuration file. The unified configuration file may be assembled in memory only and not saved separately to disk or other non-volatile memory. The unified configuration file, with the configs from the third-party developer, is then read to instantiate objects. The objects are instantiated from classes in the shared library of files, including those delivered by the third party developer in the MAR file. The instantiated objects make up the new, executable cloud application.

The third-party developer's tenant access list can also be extracted from the MAR file and automatically implemented for user access to particular services.

Yet other embodiments relate to systems and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures:

FIG. 5 shows a merged XML config file in accordance with an embodiment.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Overview

An exemplary embodiment is a completely upgraded version of the a financial management suite of products built using the standard Oracle technology stack for enterprise performance management (EPM) applications. It is an enterprise-level application suite for businesses. Initial versions may release on a cloud based system only, but other versions may release on local networks at customer sites.

The exemplary embodiment can be an extensible application development platform for the production of a number of financial applications. The financial applications themselves can be produced in a phased roll-out schedule with phase one concentrating on financial close, financial planning and tax. One guiding principle for the design and production of these applications is that they will be declarative and metadata driven.

The exemplary embodiment is designed in compliance with a target architecture. The target architecture defines three distinct architectural sections: Core Fusion Middleware (FMW), Platform Layers, and Application Layers. The exemplary embodiment can use the same architectural sectioning leveraging as much of the Core FMW section. It can build a Platform Layer section for common functionality and then allow applications to build on top of the Platform in the Application Layers sections.

Architectural layering is provided to enforce a dependency graph between layers in the system. A layer can "reach" down the entire layer hierarchy of the dependency graph to directly use and embed any lower layer's artifacts. The dependency is typically directed with no circular dependencies allowed. Conversely, a layer generally cannot reach back up the heirarchy.

The architectural layers provide natural implementation, production, and delivery boundaries facilitating parallel development. Architectural layering provides loose coupling defined by published interfaces. This allows clear ownership and responsibility of sub-systems and sub-packages.

Figure 1:
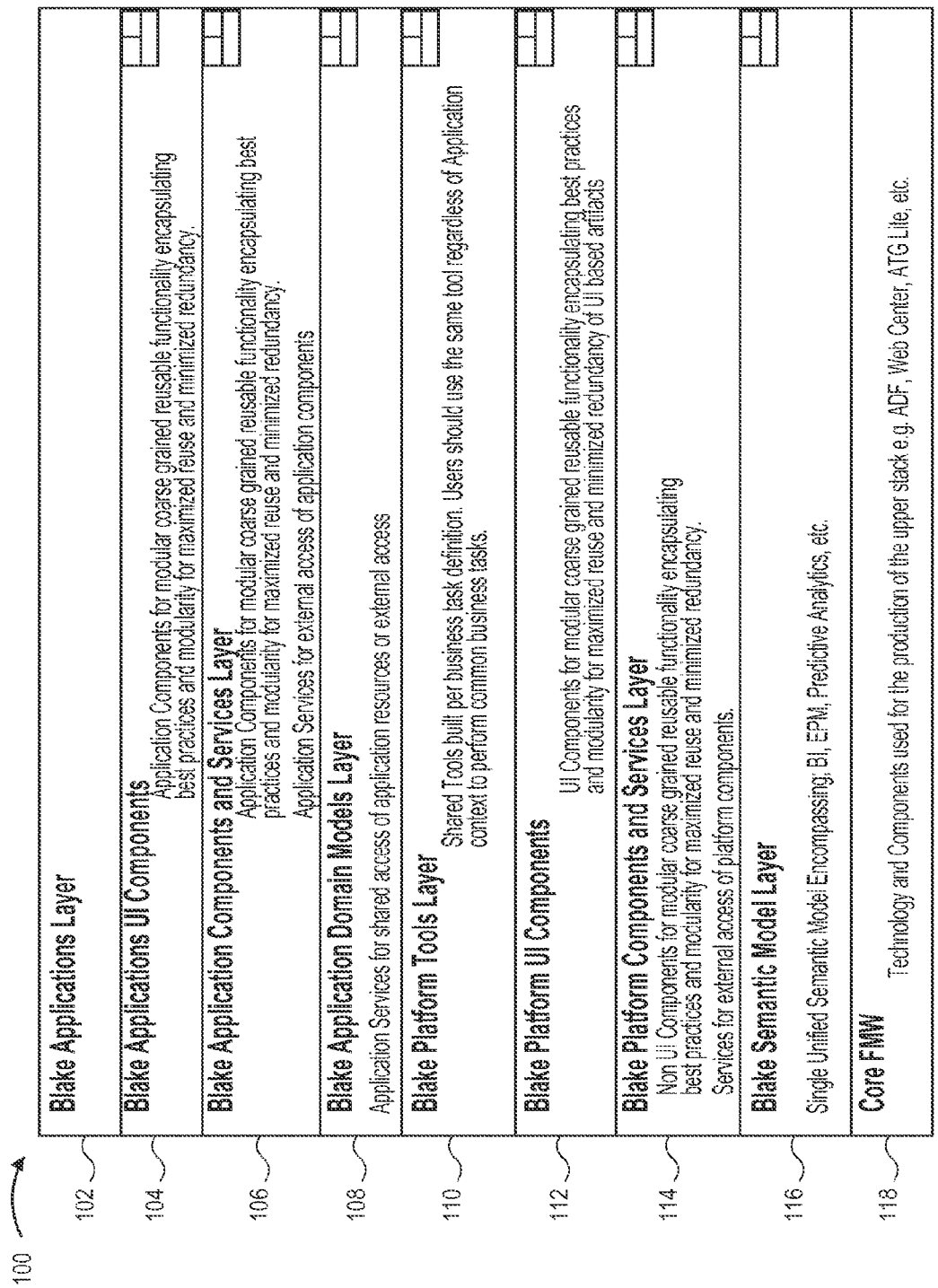
FIG. 1 illustrates logical layers of a cloud-based Software as a Service (SaaS) platform in accordance with an embodiment.

An architectural layer groups like aspects of the system together. A "layer" defines an encapsulated set of software artifacts that interact within the layer to provide desired functionality. These artifacts are then available to layers higher in the architectural stack via published interfaces FIG. 1 depicts functional architecture 100 of an embodiment. At the top layer, applications are within Blake Applications layer 102. In the next layer down, Blake Application UI Components Layer 104, there are contained application user interface (UI) components for modular coarse grained reusable functionality, encapsulating best practices and modularity, for planned maximized reuse and minimized redundancy. In the next layer, Blake Application Components and Services Layer 106, non-UI application components for modular coarse grained reusable functionality, encapsulating best practices for maximized reuse and minimized redundancy, are located. Application services for external access are located here. Note that UI and non-UI services are in separate layers. In the next layer, Blake Applications Domain Models Layer 108, application domain metadata models are located. These services are for shared access of application resources or external access.

In the fifth layer down of the figure, Blake Platform Tools Layer 110, shared tools are built per a business task definition. In the next layer down, Blake Platform UI Components Layer 112, user interface components for modular coarse grained reusable functionality are stored. They are designed to encapsulate best practices and modularity for maximized reuse and minimized redundancy of UI based artifacts. In the next layer, Blake Platform Components and Services Layer 114, non-UI components for modular coarse grained reusable functionality are located. They encapsulate best practices and modularity for maximized reuse and minimized redundancy of non-UI based artifacts. Services for external access of platform components are located here. In the next layer, Blake Metadata Models (a.k.a., Blake Semantic Model Layer 116), metadata models are built for declarative definitions. A single unified semantic model encompasses business intelligence (BI), enterprise performance management (EPM), predictive analytics, etc.

In the bottom layer, Core Fusion Middleware (FMW) layer 118, technology and components used for the production of the upper stack, e.g. Oracle Application Development Framework (ADF), Web Center, Art Technology Group (ATG) Lite, etc., are located.

UI and non-UI services are kept separate by design, using features of Oracle JDeveloper ("JDev"). During development, the code artifacts deployed within an EAR (enterprise archive) file are separated into two JDev workspaces. The first is the "core" workspace, which is for development of non-UI based Java code and the data control providers which will expose those systems to the UI binding layer. The second is for the UI components themselves, which will consume the data control providers developed in the core workspace.

A technical advantage to staging the workspaces this way allows a developer to restrict the data control providers to load into the JDev integrated development environment (IDE) for the Web workspace and disallow them to load into the JDev IDE for the core workspace. It is often necessary to develop data control providers in a separate environment from the one where they are loaded. Developing and loading them in the same environment could cause JDev to not start due to a bug in the data control provider. Separation allows for debugging a UI project even if there is an initialization issue with the provider.

Figure 2:
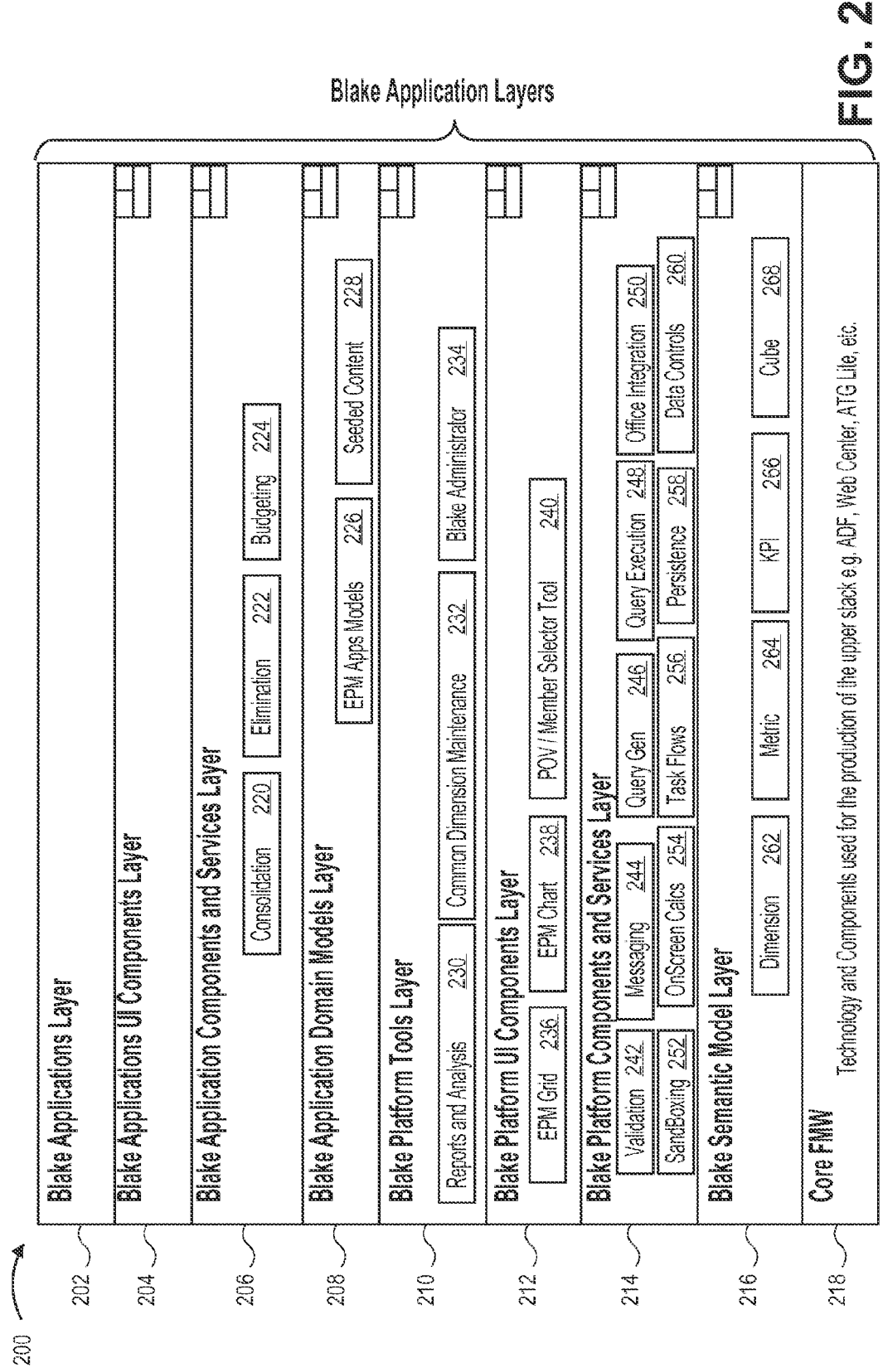
FIG. 2 illustrates logical layers of an instance of a cloud-based SaaS platform in accordance with an embodiment.

FIG. 2 illustrates an instance 200 of the exemplary embodiment. The top two layers, Blake Applications Layer 202 and Blake Applications UI Components Layer 204, are standard in this embodiment. In the third layer, Blake Application Components and Services Layer 206, consolidation 220, elimination 222, and budgeting 224 services are located. In the fourth layer, Blake Application Domain Models Layer 208, EPM application models 226 and seeded content 228 are located.

In the fifth layer of the figure, Blake Platform Tools Layer 210, reports and analysis 230, common dimension maintenance 232, and Blake administrator 234 services are located. In the sixth layer, Blake Platform UI Components Layer 212, EPM grid 236, EPM chart 238, and POV (point of view)/member selector tool 240 services are located. In the seventh layer, Blake Platform Components and Services Layer 214, the following services are located: validation 242, messaging 244, query generator 246, query execution 248, office integration 250, sandboxing 252, on-screen calculations 254, task flows 256, persistence 258, and data controls 260. In the eighth layer, Blake Semantic Model Layer 216, dimension 262, metric 264, key performance indicator (KPI) 266, and cube 268 extensions are located.

The bottom layer, Core FMW 218, is not discussed in this instance.

In order to achieve the target architecture, the exemplary embodiment is modularized into a set of functional areas called sub-systems, which break the exemplary embodiment up into manageable pieces that can be identified, designed, de-risked, and produced.

These sub-systems define a public set of APIs (application programming interfaces) for access to and manipulation of their internal functionality. The exemplary embodiment platform can provide core technology to be used in the re-design and implementation of many existing financial suite products. In order to build a platform that will encompass not only the existing functionality but allow for the development of new and innovative features, the exemplary embodiment platform can provide an extension mechanism built in at the core of the system. There a number of requirements and design goals that benefit from this aspect.

One sub-system design goal of the platform is to encapsulate all internals of the sub-systems. The sub-system design enforces that all access come thru public and defined interfaces. A technical advantage of this design is that it encourages and in many ways enforces that the sub-systems are decoupled from each other. This design further mandates that communication between specific sub-systems is done thru public interfaces and registered call-backs to specific types of functionality.

The sub-systems that communicate with other sub-systems via configuration and call back delegation can be developed independently. It is preferred to maintain the isolation and keep all configuration information local to the participating sub-system. That is, developers preferably should not be able to change sub-systems that they do not directly own.

The platform should evolve as features become available. This means that the platform itself should be cognizant of what features are currently available and what it can and cannot show to an end-user.

Based on schedules and priority there may be features required by consumers of the platform that many not be provided by an internal developer. As such, it would be prudent to allow features to be added to the platform by other teams or partner companies.

The extension mechanism can be built into the core of the system. The platform itself can use this extension mechanism to register features for extensible sub-systems. One goal of this paradigm is if the platform uses its own extension mechanism, external use will come at little or no development cost.

Application "extensions," or "add-ins," provide a way to extend the platform without changing platform source or rebuilding the platform files or other extensions. Extensions can provide the same structure as the platform and follow the same rules to generate a shared library that contains the UI and code for the extension. Extensions will provide a MAR file with the registration information needed to allow the platform to show the extension as an integrated component. Extension shared libraries will be deployed along with the platform shared library.

The overall design of the system can be a cooperating set of loosely coupled sub-systems. The sub-systems will be wired together or communicate via publicly defined interfaces. There may be one exception to this paradigm at the very core of an embodiment; namely the metadata definitions. There can be a number of sub-systems or portions of sub-systems that will define metadata definitions which can be used throughout the system. These definitions are the exposed surface of the sub-systems in which they are designed. These definitions may be intended to be used directly by dependent sub-systems to achieve the declarative nature of the embodiment.

The sub-systems functionality will be encapsulated and exposed via standard input and output specifications. The sub-systems, however, should still be factored in terms of the "Target Architecture." In order to achieve this, the sub-systems can be broken down into package specifications. It is important to note that the sub-systems as defined can cut across the various layers of the "Target Architecture;" packages, however, typically may not. As part of the design aspect of the system, each sub-system will provide an overall design as well as a package breakdown which will then be placed into the target architecture. The sub-system breakdown is targeted to keep functional boundaries clean; the subsequent package breakdown is targeted to keep the delivery architecturally sound.

Figure 3:
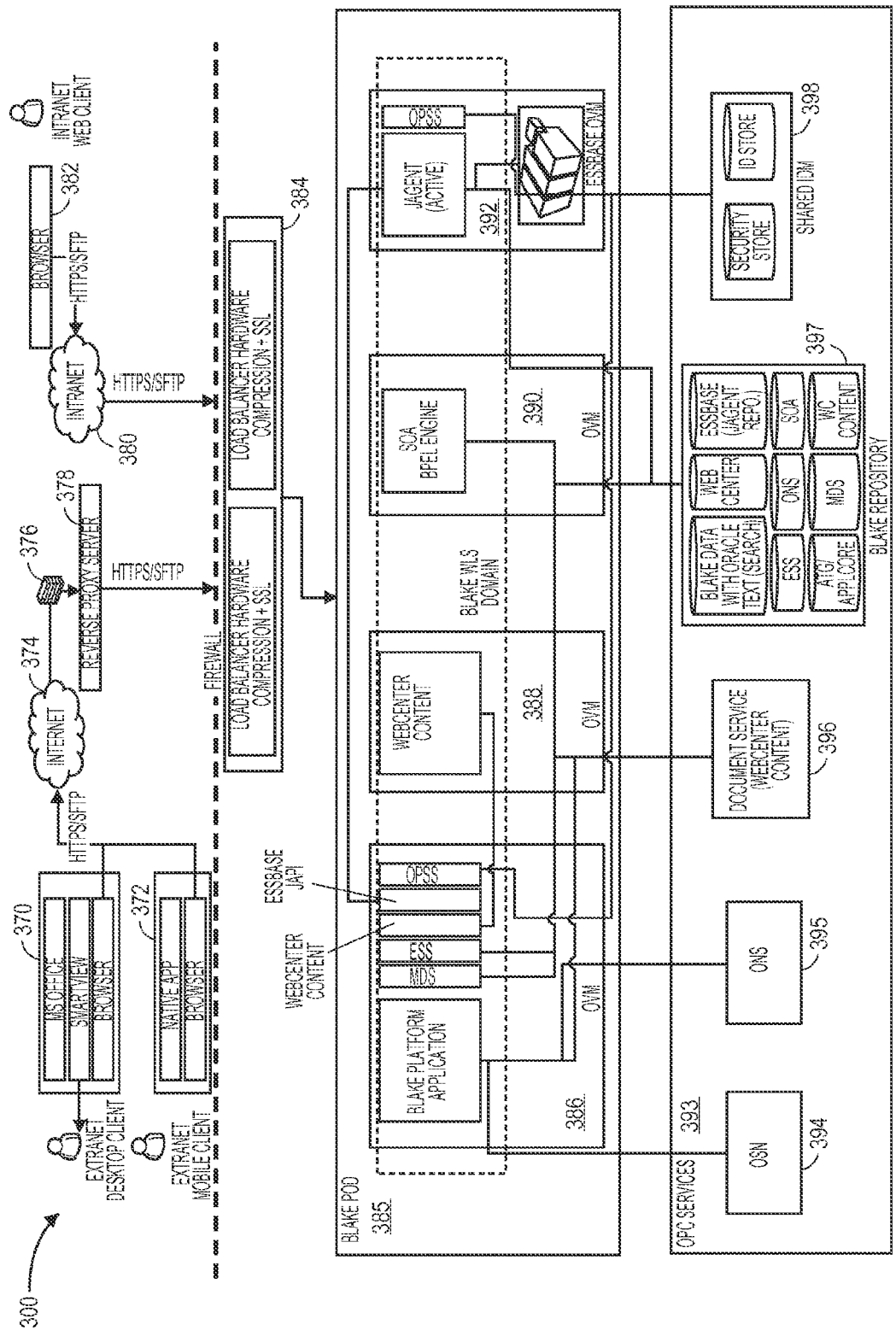
FIG. 3 illustrates physical layers of a cloud-based SaaS platform in accordance with an embodiment.

FIG. 3 illustrates the physical architecture of system 300, an exemplary embodiment. An extranet desktop client 370, running Microsoft Office, Oracle Hyperion Smart View, and a Web browser may connect to the system 300 using the hypertext transfer protocol-secure (HTTPS) or secure file transfer protocol (SFTP) through the Internet 374 to a reverse proxy server 378. The reverse proxy server 378 connects through a firewall 376 to load balancer hardware 384 that uses compression and a secure socket layer (SSL). An extranet mobile client 372 may run a native application and browser with HTTPS or SFTP through the same means. Alternatively or in addition, an intranet Web client 382 may run a browser with HTTPS or SFTP through a company intranet 380, connecting to dedicated load balancer hardware 384 that uses compression and a secure socket layer.

Behind a cloud enterprise firewall, the load balancer hardware 384 connects with a pod 385. A pod is a logical grouping of one or more virtual machines, such as an Oracle Virtual Machine (OVM). Pod 385 has a fixed pod size and a fixed number of virtual machines, managed, and deployed servers.

The pod 385 includes OVMs running a platform application, which connects to Oracle Public Cloud (OPC) services, including Oracle Social Network (OSN) 394, Oracle Notification Service (ONS) 395, and a document service through Oracle WebCenter 396. OVM 386 runs Oracle metadata services (MDS), enterprise scheduler service (ESS), Web Content, Essbase Java API (JAPI), and Oracle platform security services (OPSS). OVM 388 runs Oracle WebCenter for content, and OVM 390 runs an Oracle service-oriented architecture (SOA) business process execution language (BPEL) engine. OVM 392 runs Jagent and OPSS with Essbase.

MDS, the SOA BPEL engine, and Jagent connect with Oracle text (search), WebCenter, Essbase (JAgent repository), ESS, ONS, SOA, ATO/ApplCore, MDS, and WC Content in module 397. The OPSSes connect with shared identify manager (IDM) 398, including a security store and identification store.

The exemplary embodiment is built for multi-tenancy, with pods being provisioned based on the size of a customer and pod availability. A given pod can contain tenants all of the same size. The pod size and its resources can remain constant, and the number of tenants a pod can service can change based on its category. New pods can be spawned and assigned as the need grows and as tenant service level agreement (SLA) requirements dictate.

Products can be deployed into the platform using shared libraries and Oracle Fusion middleware repository creation utility (RCU) scripts. Shared libraries can contain:
1. Java class files and libraries for the product;
2. Web UI developed for the product;
3. Registration metadata for MDS for registration of product actions/views; and
4. Predefined content for MDS, which may include Apps, Models, Reports, Grids, etc.

A shared library's files nominally include:
1. JAR files for data control providers and back end code;
2. a WAR (Web application archive) file, including JSPX and task flows; and
3. MAR (metadata archive) files, including product files and platform registration.

An RCU script for setting up the database can be run against the database.

Config Files

Several aspects of the exemplary system allow a product to modify the behavior of the platform. One aspect is a collection of defined extensible markup language (XML) files deployed with the product into Oracle metadata services (MDS) in Fusion middleware. A second aspect is customized XML created using JDev customization and deployed with the product into MDS. The XML configuration files (a.k.a. "config files") can be modified by developers, either within or outside of the cloud provider, for their add-ins. The config files, if passed back to the Blake platform correctly, will be re-read upon a restart, and the system will automatically configure itself to use the new add-ins using the new config files.

One aspect of extensibility design is to leverage MDS layered customizations of an XML file defined by an XML schema. A sub-system that requires the registration of extensions to its core functionality will define the extension points using an XML schema to declare the structure of its configuration and two initial configuration files—one for internal platform developments and one for external platform developers. The actual modification and packaging of the extended information can be done using Oracle JDeveloper Extensions and ADF Library Jars for modification and MAR deployments for packaging. Of course, this is not limited to Oracle's cloud system but can be practiced by any cloud SaaS provider.

Figure 4:
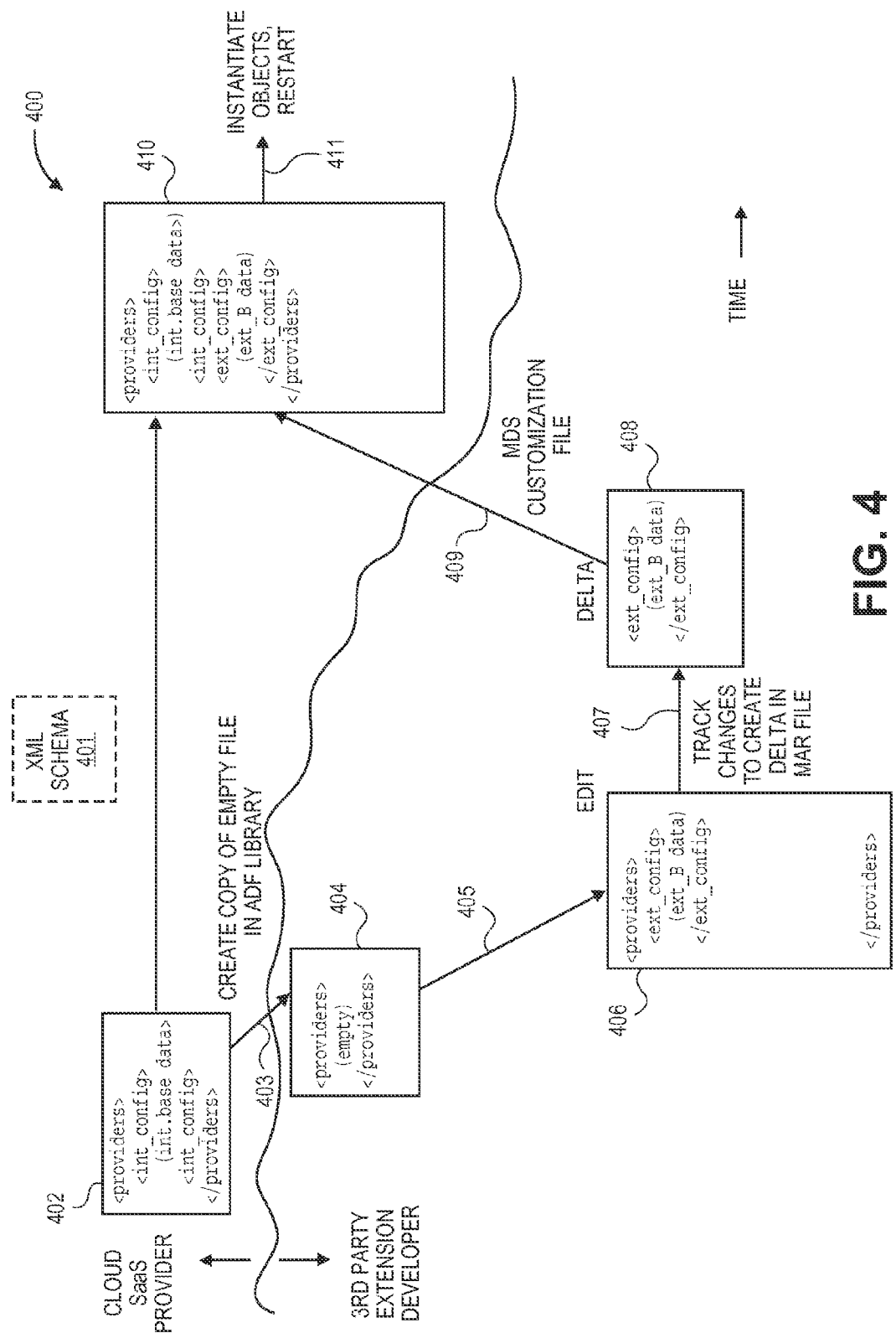
FIG. 4 illustrates the passing of configuration files in accordance with an embodiment.

FIG. 4 illustrates the passing of configuration files in accordance with an embodiment. In the figure, which shows process 400, time increases when moving to the right. Config file 402 is produced by a cloud SaaS provider. Config file 402 conforms to XML schema 401 and includes config data for internal (i.e., internal to the cloud SaaS provider) sub-system extensions. In step 403, an 'empty' copy of the config file 402 is created to produce config file 404. Empty config file 404 is not actually empty; rather, it contains no configuration entries based on XML schema 401. It merely contains headers and the like with no child elements. Empty config file 404 is provided to a 3rd party extension developer for editing, outside the cloud services provider. It can be said that config file 404 is transferred across a cloud services provider firewall to an computer environment not protected by the firewall.

In step 405, the 3rd party extension developer modifies empty config file 404 to create config file 406. Because the 3rd party extension developer would not normally delete any of the headers or related tags from empty config file 404, it can be said that the 3rd party extension developer adds to empty config file 404 in order to create config file 406.

In step 407, delta file 408 is created from the 3rd party extension developer's changes memorialized by config file 406. Delta file 408 contains only changes from empty config file 404 to config file 406. The delta file is included in a MAR file, which is placed in an MDS customization file. The delta file can be created automatically, without direct human intervention.

Delta file 408 can be created by tracking a user's edits to the copy of the file. It can also be created by comparison between the starting and ending documents. For example, document 406 can be compared with document 404 using a diff utility.

In step 409, delta file 408, within an MDS customization file, is parsed and automatically inserted or otherwise reconciled into config file 402 to create config file 410, a unified configuration file. Unified config file 410 can include delta file 408 as well as various other delta files from other 3rd party extension and internal developers for their extensions and add-ins. In some embodiments, unified config file 410 may exist in volatile memory only and not on disk or other nonvolatile memory. In other embodiments, unified config file 410 can be saved as its own file in a file system.

In step 411, a restart of the system initiates a re-reading of the unified config file 410, such that the proper objects are instantiated from classes in shared libraries. These shared libraries include unified config file 410, which configures the system for the proper objects to be loaded.

If there is an error reading the configuration from delta file 408 in unified config file 410, the system 400 passes over it and continues reading other configurations from the file. In this way, one developer with faulty code does not corrupt the entire system. Instead, the developer's extension is simply not available at run time.

FIG. 5 shows a merged config file in accordance with an embodiment. Internal config file 402 has been merged with delta file 408 to create unified config file 510. At the top are the XML version and encoding, followed by the providers tags with the specified namespace and XML schema. The internal configurations are included first, and then the third party sub-system configuration, in the contents from delta file 408, is included. The merging is performed behind the firewall of the cloud service provider, thereby ensuring secrecy of the internal configurations. That is, the internal configuration never has to be transferred external to the cloud service provider's firewall.

Although the internal configurations come first in the exemplary embodiment, other orders of configurations are envisioned.

In some embodiments, an internal and external XML configuration file will be packaged in two separate ADF Library Jars, which will allow the files to be customized in JDeveloper Studio. The internal file will be provided to Blake platform developers to be included into their specific sub-system projects. Once there, a Blake platform developer can create the customizations to this file in JDeveloper customizer role. The customizations will be packaged by the project or sub-system in its shared library as a MAR file.

The external file will be provided to external platform developers to be included in their projects. They can customize this file in the same way internal developers will customize the internal file. The provider of the sub-system and customization files will read these two files and merge the results to form the global set of configurations.

Figure 6:
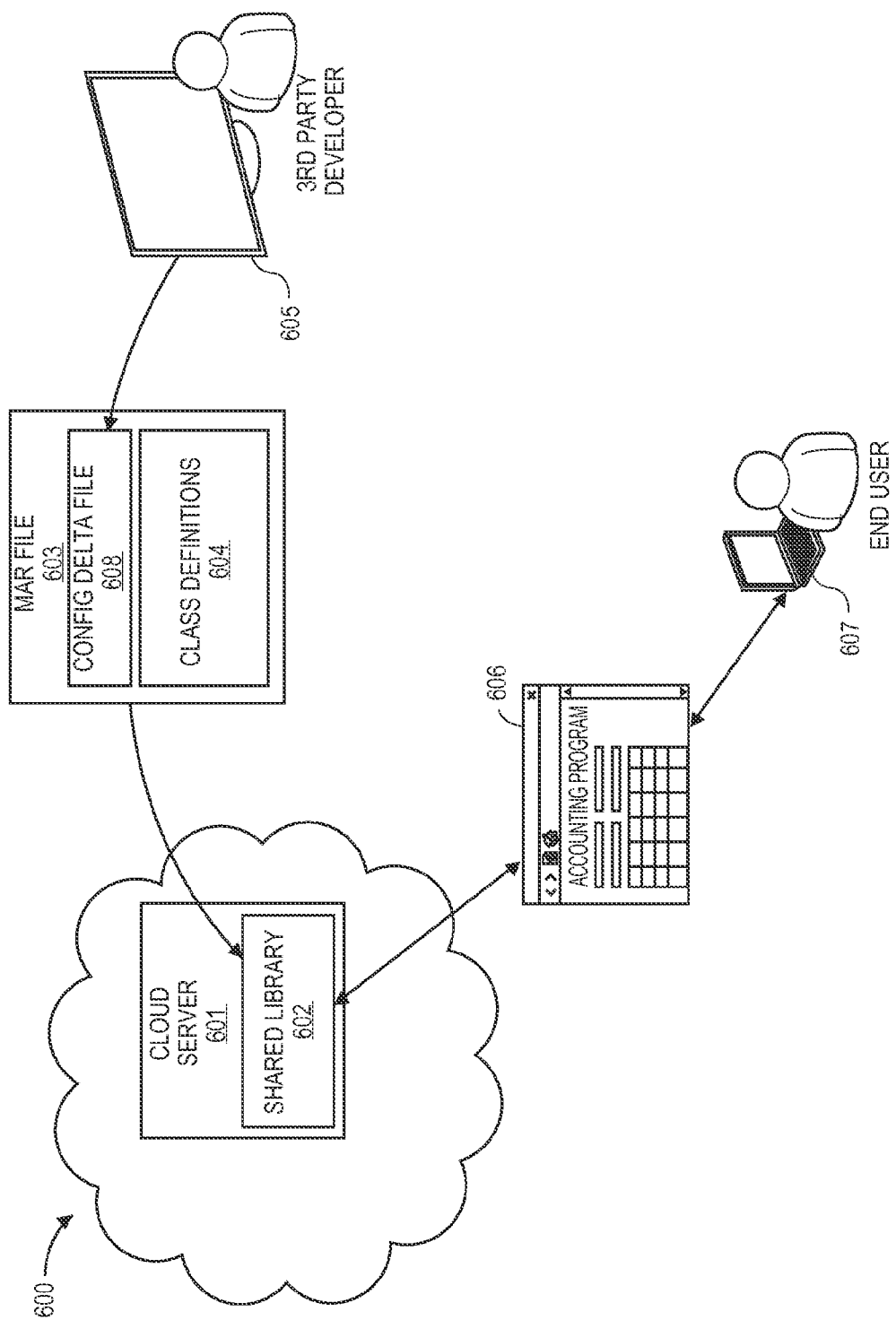
FIG. 6 illustrates a third-party developer and end user relationship in accordance with an embodiment.

FIG. 6 illustrates a third-party developer and end user relationship in accordance with an embodiment. In system 600, cloud server 601 contains shared library 602 of dynamic library executables, comprising a cloud application.

Third-party developer 605 prepares his or her own extension to work with the cloud application, essentially creating class definitions 604 for his or her service. Third-party developer 605 also prepares configurations for the service and class definitions 604. Those configurations are deposited in configuration delta file 608. Configuration delta file 608 and class definitions 604 are dropped into MAR file 603 and then delivered to cloud server 601.

Once config delta file 608 is merged with the internal configuration file for the cloud provider's application, it is treated like any other configuration. Cloud server 601 reads the updated configuration file and instantiates objects from class definitions 604 based on the updated configuration file. The instantiated objects are available as services in application 606 for end user 607 to use.

Class definitions and configurations that are developed internal to the cloud service provider and those that are developed external by third-party developers to the cloud service provider can be handled relatively equally by middleware that implements functions of the enterprise software.

Figure 7:
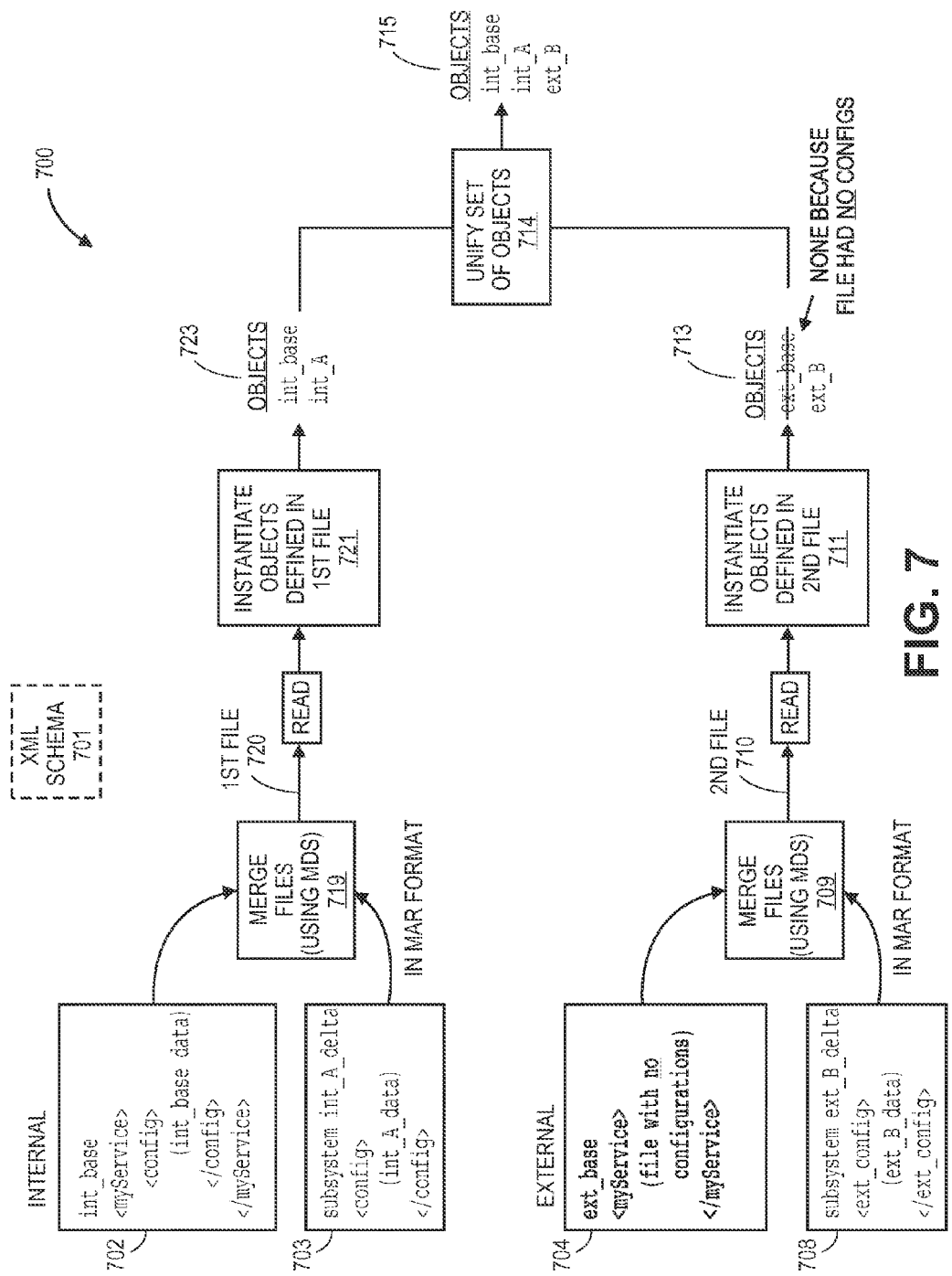
FIG. 7 illustrates unifying a set of objects from internal and external developers in accordance with an embodiment.

FIG. 7 illustrates unifying a set of objects from internal and external developers in accordance with an embodiment. In process 700, time increases when moving to the right and all steps occur inside the cloud servers except for preparing external delta configuration file 708. All configuration files are compatible with XML schema 701.

Internal delta configuration file 703 is provided by internal developers for core services in a MAR file. Internal base configuration file 702 and internal delta configuration file 703 are then merged using MDS in step 719 into first config file 720. It is read and then used to instantiate objects in step 721. Objects 723 for the internal base services and internal adjunct services are then instantiated, ready for use.

External delta configuration file 704 is provided to third-party developers for editing to make external delta configuration file 708. External base configuration file 704, which may be empty, and external delta configuration file 708 are then merged using MDS in step 709 into second config file 710. It is read and then used to instantiate objects for the externally developed services in step 711. Objects 713 for the third party services are then instantiated, ready for use. Note that because there were no external base configurations, no external base objects are instantiated.

In step 714, internal and external objects 723 and 713 are unified into a common set of objects 715. While referred to as 'internal' and 'external' objects, all of the objects are created on the cloud server. The 'internal' and 'external' designations merely describe whether they were from internal or external developers. After the set of objects are unified, unified set of objects 715 is available as a software application and services on the cloud computing network.

Figure 8:
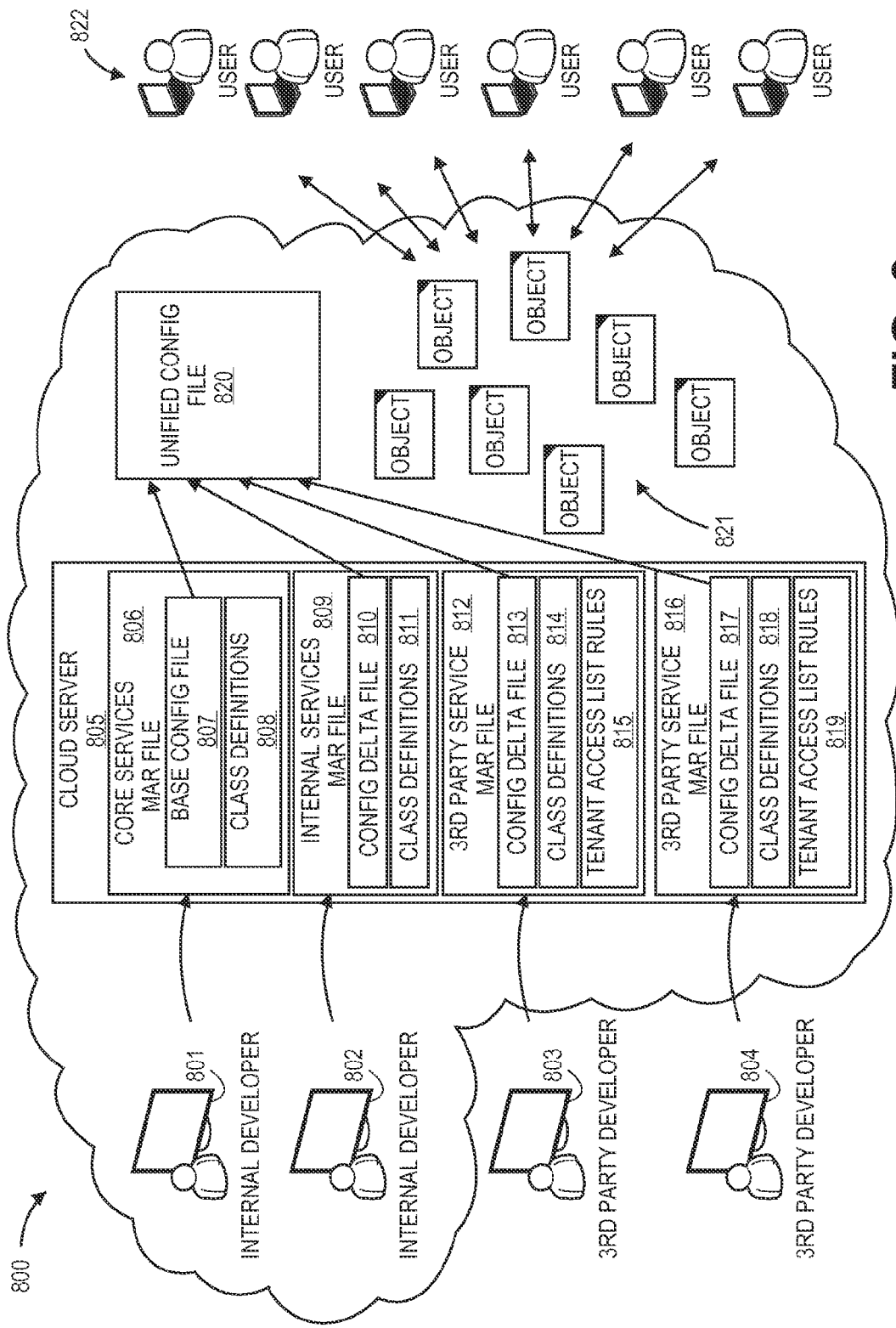
FIG. 8 illustrates a cloud server providing combined software from multiple developers in accordance with an embodiment.

FIG. 8 illustrates a cloud server providing combined software from multiple developers in accordance with an embodiment. In system 800, internal and external developers create services for a cloud application that runs on a server for end users 822.

Internal developer 801 writes base configuration file 807 and internal class definitions 808 and packages them in MAR file 806. MAR file 806 is then transferred to cloud server 805.

Likewise, internal developer 802 writes configurations and class definitions 811 and packages them in MAR file 809. However, the base configuration file that internal developer 802 began with is empty, or contains only limited other configurations. Configuration delta file 810 is a delta file from that base configuration file, containing only additions to the file. MAR file 809 is then provided to cloud server 805 to be used with core services 806. All authenticated, subscribed users for the particular services of the cloud SaaS application can use the services provided in MAR files 806 and 809 as determined by the cloud service provider.

Third-party developers 803 and 804 write configurations and class definitions for their third-party services 812 and 816, respectively. For third party service 812, configuration delta file 813, class definitions 814, and tenant access list rules 815 are provided in a MAR file from third-party developer 803. For third party service 816, configuration file 817, class definitions 818, and tenant access list rules 819 are provided in a MAR file from third party developer 804.

Cloud server 805 combines internal base configuration file 807, internal configuration delta file 810, third-party service 812 configuration delta file 813, and third-party service 816 configuration delta file 817 in unified configuration file 820. Effectively, the internal and external configuration files are treated the same. One technical advantage of this is that multiple configuration file readers and adaptors do not need to be devised or implemented. Testing of the system for an internal developer may be sufficient for external developers.

Cloud server 805 uses unified configuration file 820 to read related class definitions 808, 811, 814, and 818 and instantiate objects 821. These objects, collectively a computer program, can be used by users 822. Some of the objects are for the third-party developer's services, which are transparently intermingled with the base services.

Tenant access list rules 815 and 819 are implemented by cloud server 805 to grant or block access to the third-party developer's services to certain users. For example, users who have subscribed to services of third-party developer 803 through a web site on cloud server 805 may be granted access if the number of seats for utilizing the service are not already filled up by the tenant user. This may come from incrementing a counter each time an employee of a tenant logs in. The counter decrements when the employee logs out. A tenant access list rule may specify that users who have entered a particular password have access to a premium service. As another example, mobile users may be afforded the use of different third-party services than those users using general purpose computers based upon flags in their browsers.

A tenant access list rule may simply charge an account on file for a particular tenant or otherwise automatically transfer money between accounts each time a service is accessed by one of its employees.

Figure 9:
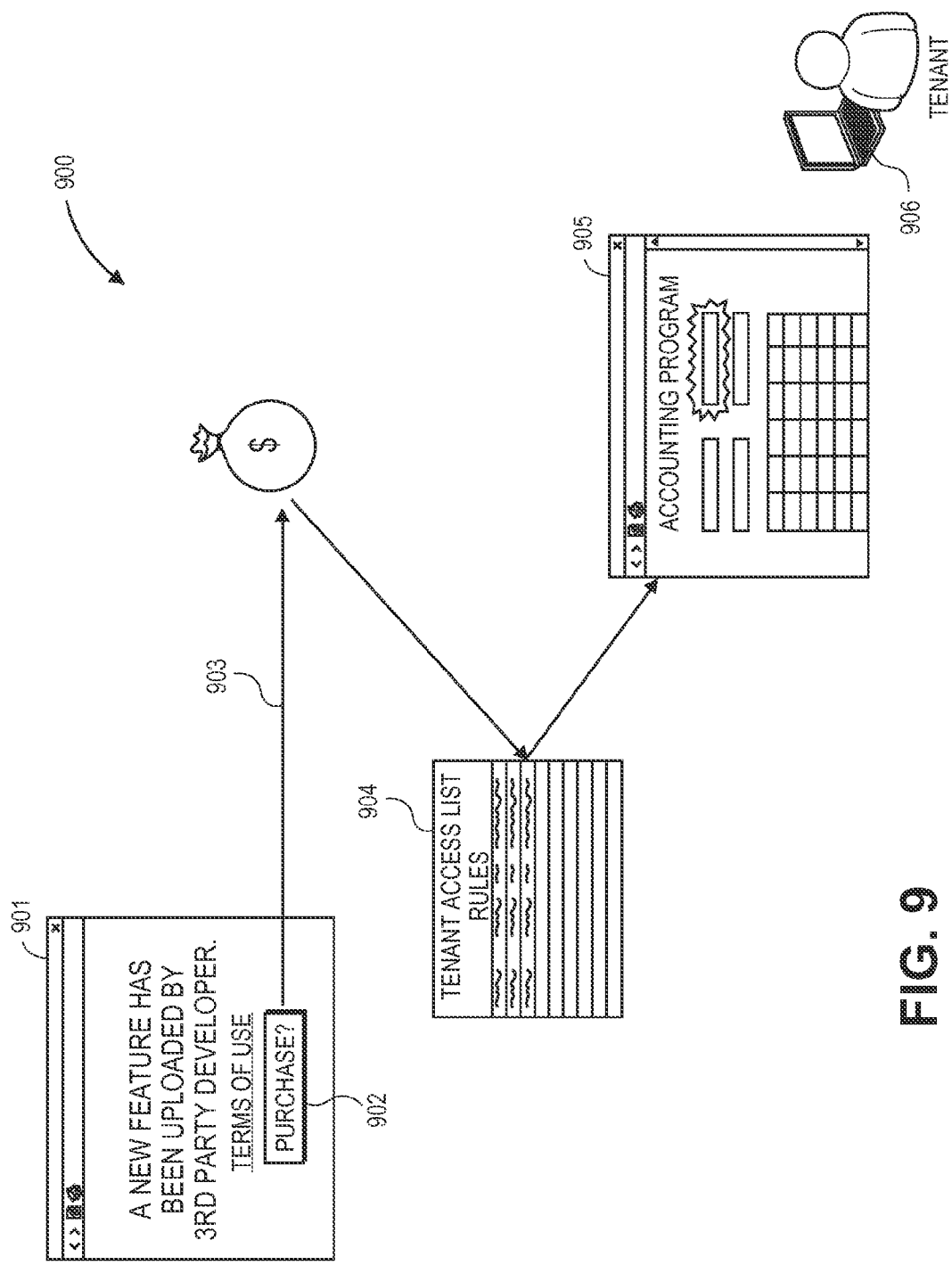
FIG. 9 illustrates a purchase of a service in accordance with an embodiment.

FIG. 9 illustrates a purchase of a service in accordance with an embodiment. In process 900, a new feature (in a service) has been provided to a cloud SaaS provider by a developer. The successful merging of the configuration file and instantiation of service objects triggers a message to go out to users.

The message may be in the form of an email, instant message, online post, short message service (SMS) text message, or multimedia messaging service (MMS) message, or otherwise as known in the art. The message may go out in response to a new service or an upgrade to an existing service. For example, a subscriber to a third-party developer's service may opt for upgrade notices to be sent by the cloud server to his or her work email. The subscriber can then decide to use the service if he or she is interested.

Message 901 indicates that a new feature of a service has been added to the cloud network by a third party developer. Active element 902, a button, is presented to the user for purchasing. After entry of data to purchase the advertised service and checkout, money is transferred in step 903 from the user to the third-party developer. The cloud provider may take a percentage or other amount for facilitating the arrangement.

Tenant access list rule 904 is updated to reflect that tenant 906 has paid for the service, and the service is provided to user 906 in an application shown in screenshot 905.

Figure 10:
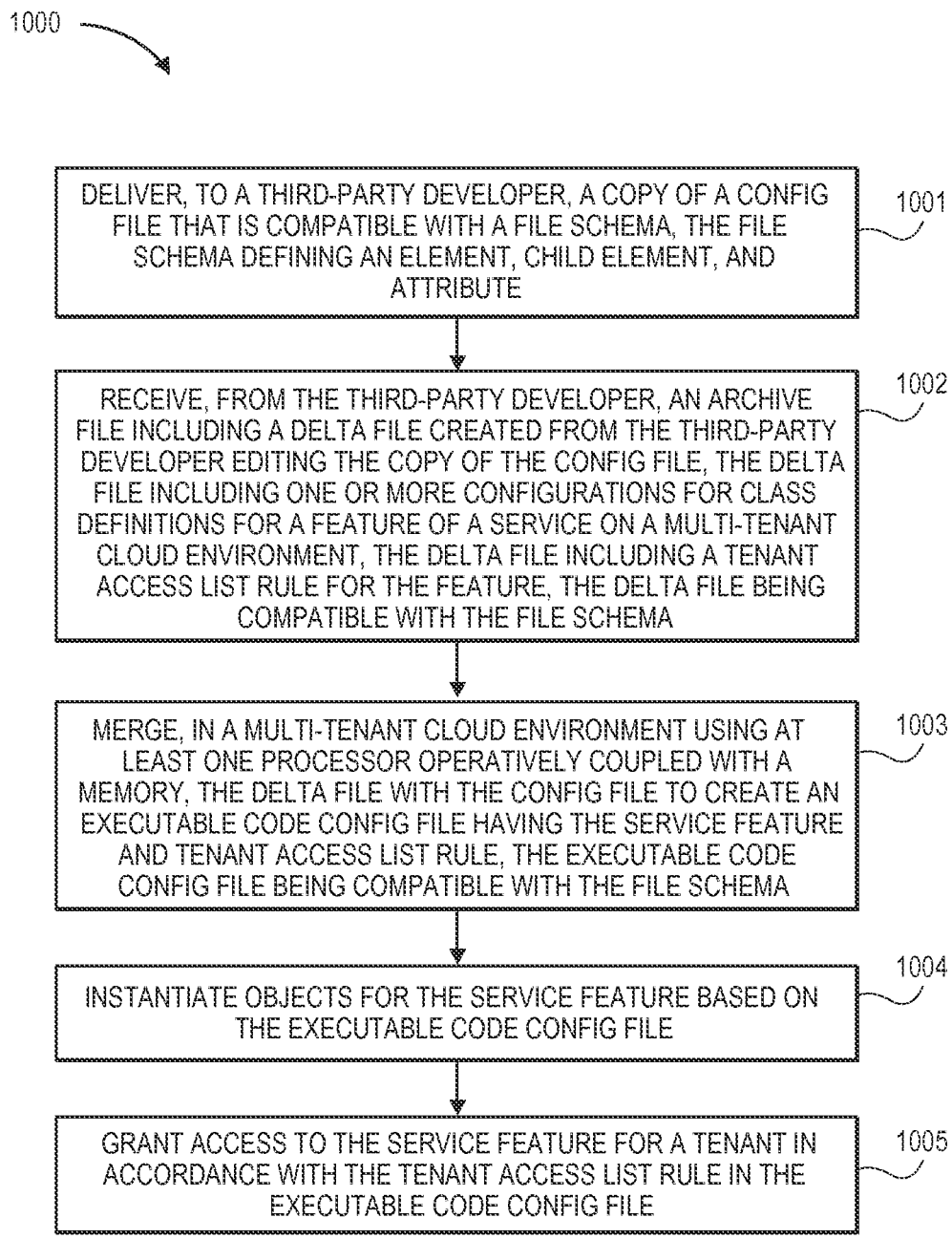
FIG. 10 is a flowchart of a process in accordance with an embodiment.

FIG. 10 is a flowchart of a process in accordance with an embodiment. Process 1000 can be implemented wholly or partly in one or more computing devices. In operation 1001, a copy of a config file that is compatible with a file schema is delivered to a third-party developer, the file schema defining an element, child element, and attribute. In operation 1002, an archive file including a delta file created from the third-party developer editing the copy of the config file is received from the third-party developer. The delta file includes one or more configurations for class definitions for a feature of a service on a multi-tenant cloud environment, the delta file including a tenant access list rule for the feature, the delta file being compatible with the file schema. In operation 1003, the delta file is merged, in a multi-tenant cloud environment using at least one processor operatively coupled with a memory, with the config file to create an executable code config file having the service feature and tenant access list rule, the executable code config file being compatible with the file schema. In operation 1004, objects are instantiated for the service feature based on the executable code config file. In operation 1005, access is granted to the service feature for a tenant in accordance with the tenant access list rule in the executable code config file.

Figure 11:
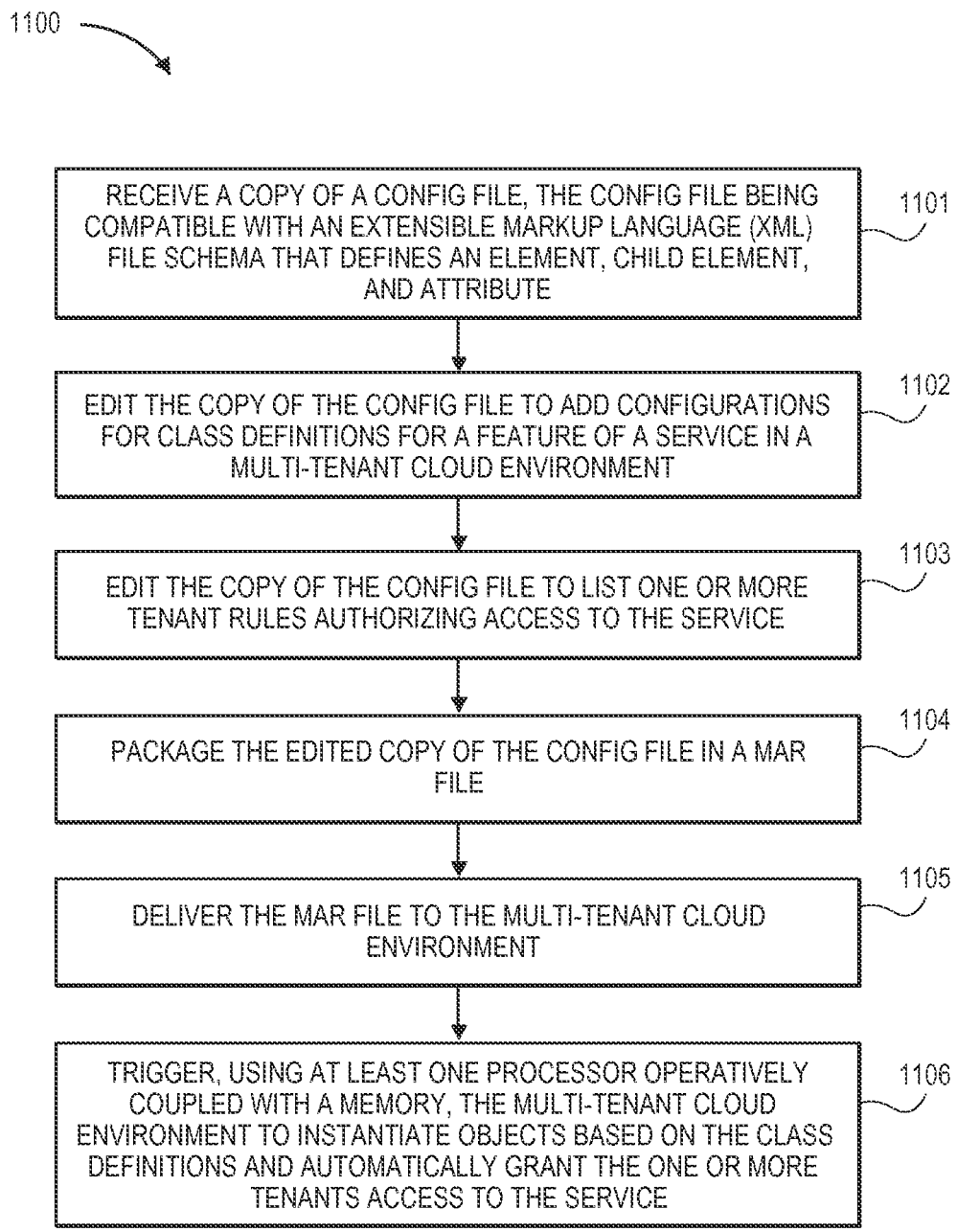
FIG. 11 is a flowchart of a process in accordance with an embodiment.

FIG. 11 is a flowchart of a process in accordance with an embodiment. Process 1100 can be implemented wholly or partly in one or more computing devices. In operation 1101, a copy of a config file is received, the config file being compatible with an extensible markup language (XML) file schema that defines an element, child element, and attribute. In operation 1102, the copy of the config file is edited to add configurations for class definitions for a feature of a service in a multi-tenant cloud environment. In operation 1103, the copy of the config file is edited to list one or more tenant rules authorizing access to the service. In operation 1104, the edited copy of the config file is packaged in a metadata archive (MAR) file. In operation 1105, the MAR file is delivered to the multi-tenant cloud environment. In operation 1106, the multi-tenant cloud environment is triggered, using at least one processor operatively coupled with a memory, to instantiate objects based on the class definitions and automatically grant the one or more tenants access to the service.

Computing Systems

Systems depicted in some of the figures may be provided in various configurations. In some embodiments, the systems may be configured as a distributed system where one or more components of the system are distributed across one or more networks in a cloud computing system.

Figure 12:
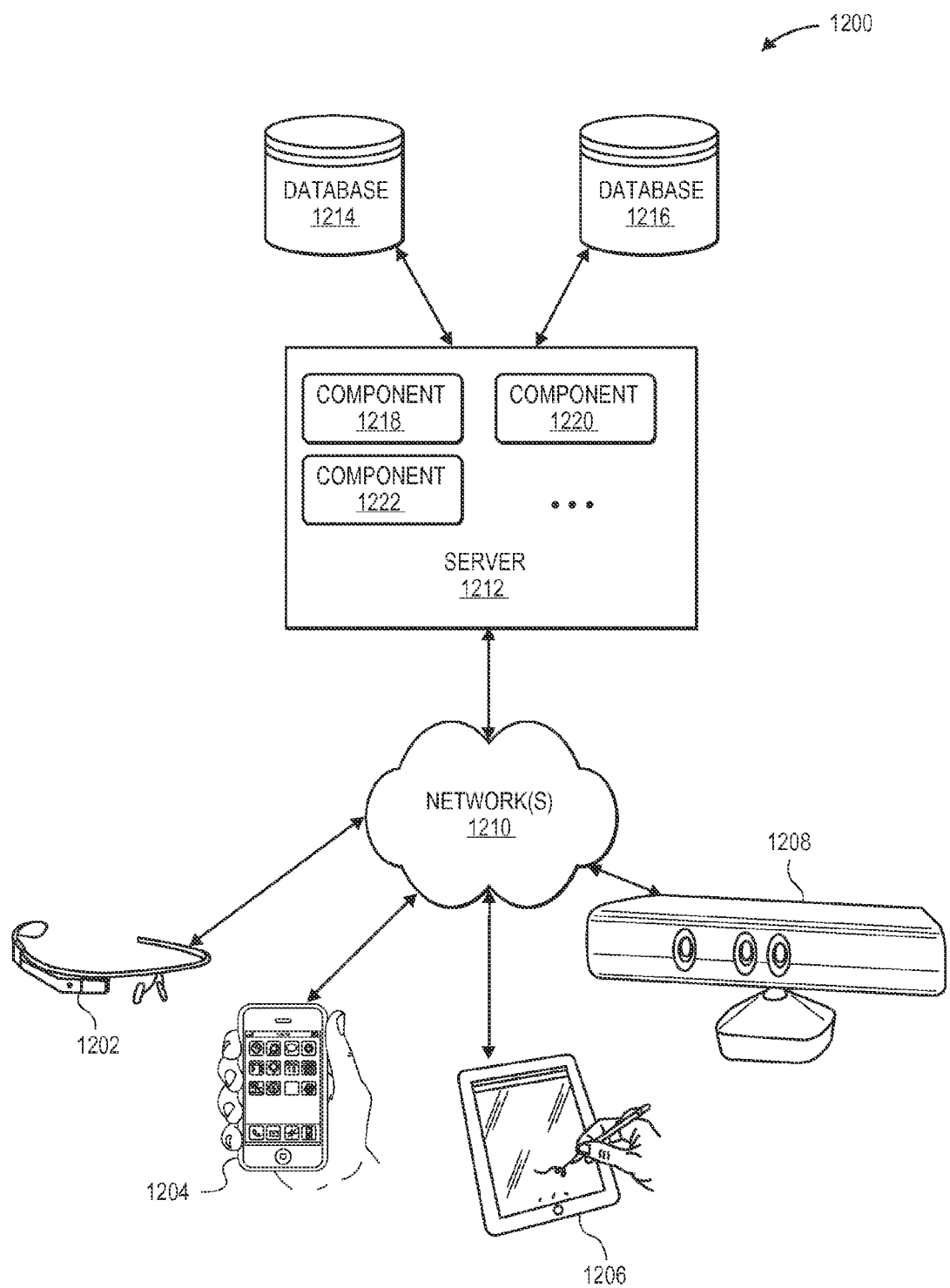
FIG. 12 depicts a simplified diagram of a distributed system for implementing one of the embodiments.

FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone® cellular telephone, an iPad® computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox® gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

Figure 13:
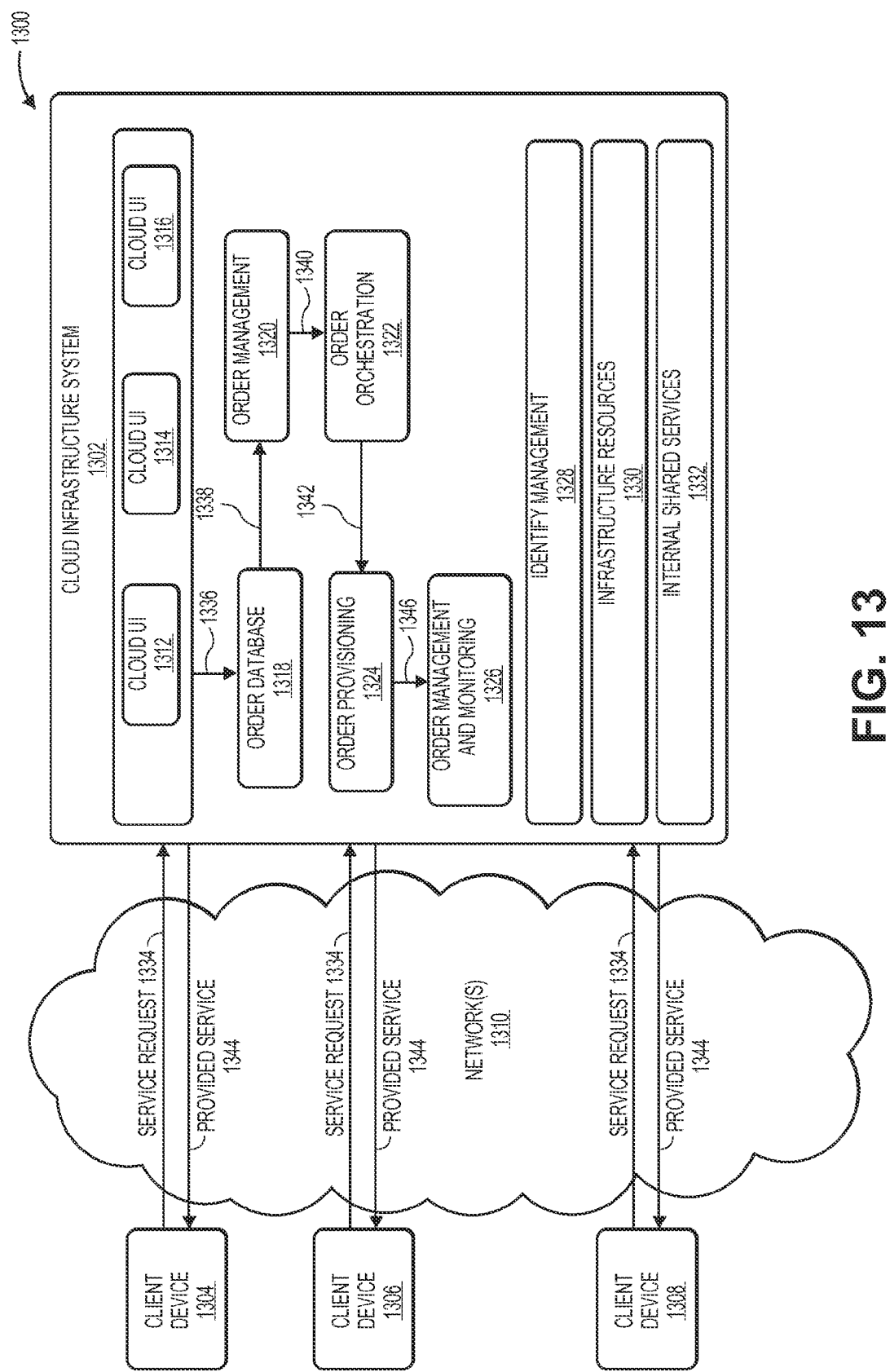
FIG. 13 is a simplified block diagram of components of a system environment by which services provided by the components of an embodiment system may be offered as cloud services, in accordance with an embodiment of the present disclosure.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

Cloud infrastructure system 1302 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
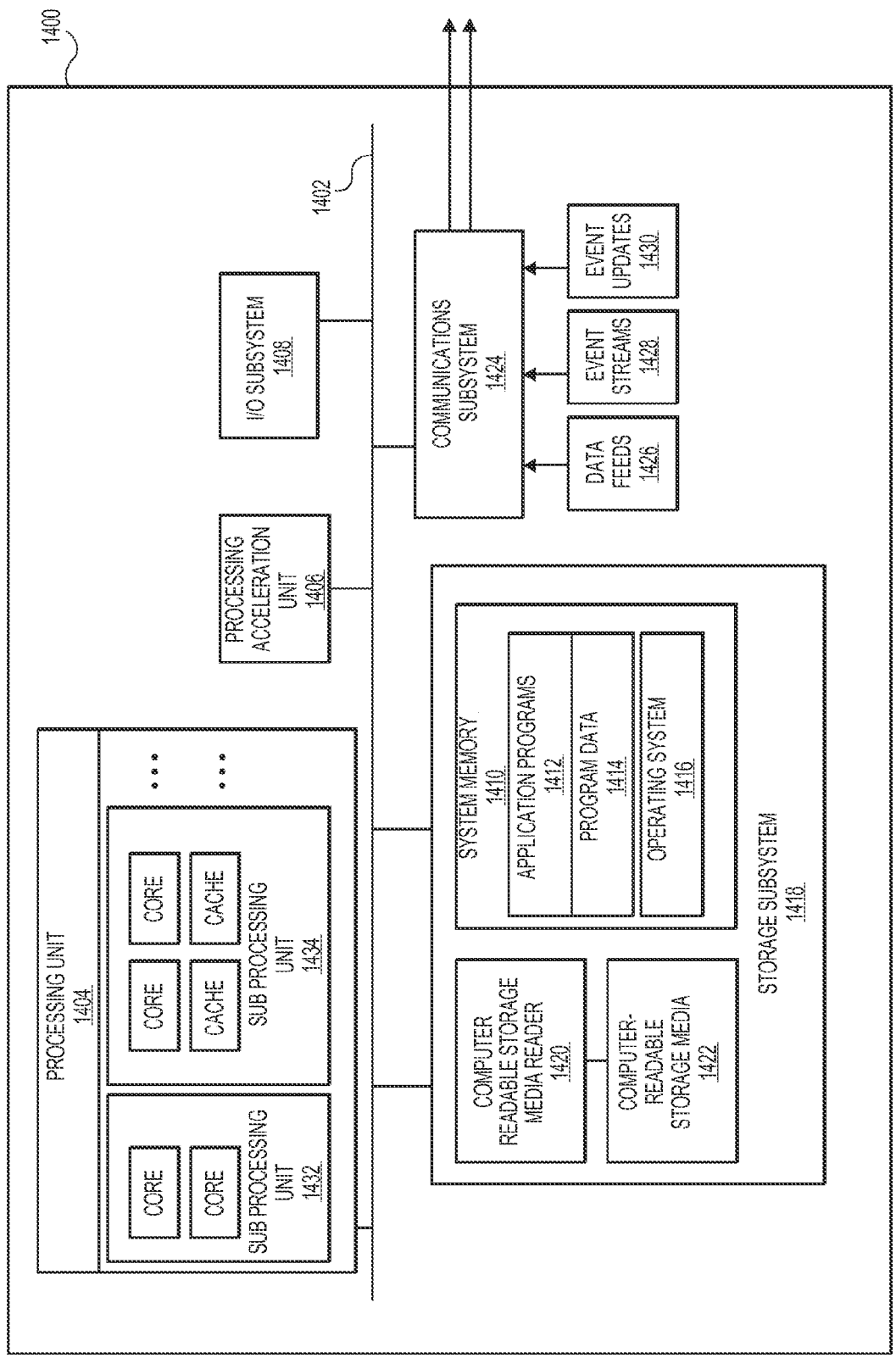
FIG. 14 illustrates an exemplary computer system, in which various embodiments of the present invention may be implemented.

FIG. 14 illustrates an exemplary computer system 1400, in which various embodiments of the present invention may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1486.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present invention.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method to allow third-party developers to enforce tenant access to features of one or more services in a multi-tenant cloud environment provided by a cloud computing system, the method comprising:
    delivering, by the cloud computing system, to a third-party developer, a copy of a config file that is compatible with a file schema, the file schema defining an element, a child element, and an attribute;
    receiving, by the cloud computing system, from the third-party developer, an archive file including a delta file created from the third-party developer editing the copy of the config file, the delta file including one or more configurations for class definitions for a feature of a service in the multi-tenant cloud environment, the delta file including a tenant access list rule for the feature of the service, and the delta file being compatible with the file schema;
    merging, in the multi-tenant cloud environment by the cloud computing system, the delta file with the config file to create an executable code config file having the feature of the service and the tenant access list rule, the executable code config file being compatible with the file schema;
    initiating the cloud computing system to restart, wherein restarting the cloud computing system causes the multi-tenant cloud environment to read the executable code config file created by merging the delta file with the config file;
    instantiating, by the cloud computing system, one or more objects for the feature of the service based on the executable code config file that is read upon restarting the multi-tenant cloud environment;
    configuring, by the cloud computing system, the feature of the service based on the one or more objects instantiated for the feature of the service; and
    upon receiving a request by a tenant to access the feature of the service, granting, by the cloud computing system, access to the feature of the service for the tenant in accordance with the tenant access list rule in the executable code config file used to instantiate the one or more objects.

2. The method of claim 1 further comprising:
    blocking access to the feature of the service for the tenant in accordance with the tenant access list rule in the executable code config file.

3. The method of claim 2 wherein the blocking is in accordance with a number-of-seats maximum in the tenant access list rule.

4. The method of claim 1, further comprising:
    incrementing a counter in the multi-tenant cloud environment based upon the granting of access.

5. The method of claim 1, further comprising:
    automatically sending a message to the third-party developer based on the granting of access.

6. The method of claim 5 wherein the message includes an email, instant message, online post, short message service (SMS) text message, or multimedia messaging service (MMS) message.

7. The method of claim 1 further comprising:
    automatically sending a message to the tenant based on the instantiating of the one or more objects, wherein the message advises the tenant of an update to the service.

8. The method of claim 1, further comprising:
    creating the delta file by tracking changes to the copy of the config file.

9. The method of claim 1 further comprising:
    creating the delta file by comparing the copy of the config file to the edited copy of the config file.

10. The method of claim 1, wherein the delivered copy of the config file has no child elements.

11. The method of claim 1 wherein the archive is a metadata archive (MAR) file.

12. The method of claim 1 wherein merging the delta file with the config file includes merging a layered customization metadata archive (MAR) file with the config file.

13. The method of claim 1, wherein the config file schema includes an extensible markup language (XML) schema.

14. The method of claim 1, wherein an empty copy of the config file is in an application development framework (ADF) library Java archive (JAR) file.

15. The method of claim 1, wherein the service includes a Java service.

16. The method of claim 1, further comprising:
    reading the executable code config file that is created by merging the delta file with the config file, wherein the executable code config file includes the one or more configurations by merging the delta file with the config file, and wherein the one or more objects for the feature of the service are instantiated using the one or more configurations read from the executable code config file;
    detecting an error reading the one or more configurations from the executable code config file; and
    upon detecting the error, preventing the one or more configurations from being read from the executable code config file;
    wherein the one or more objects for the feature of the service are instantiated without using the one or more configurations that are prevented from being read from the executable code config file.

17. A computer system comprising:
    at least one processor; and
    a memory operatively coupled with the at least one processor, the memory storing computer code that, upon execution by the at least one processor, causes the at least one processor to perform operations comprising:

delivering, to a third-party developer, a copy of a config file that is compatible with a file schema, the file schema defining an element, a child element, and an attribute;

receiving, from the third-party developer, an archive file including a delta file created from the third-party developer editing the copy of the config file, the delta file including one or more configurations for class definitions for a feature of a service in a multi-tenant cloud environment of a cloud computing system, the delta file including a tenant access list rule for the feature of the service, and the delta file being compatible with the file schema;

merging, in the cloud computing system, the delta file with the config file to create an executable code config file having the feature of the service and the tenant access list rule, the executable code config file being compatible with the file schema;

initiating the cloud computing system to restart, wherein restarting the cloud computing system causes the multi-tenant cloud environment to read the executable code config file created by merging the delta file with the config file;

instantiating, in the cloud computing system, one or more objects for the feature of the service based on the executable code config file that is read upon restarting the multi-tenant cloud environment;

configuring, in the cloud computing system, the feature of the service based on the one or more objects instantiated for the feature of the service; and upon receiving a request by a tenant to access the feature of the service, granting, in the cloud computing system, access to the feature of the service for the tenant in accordance with the tenant access list rule in the executable code config file used to instantiate the one or more objects.

18. A method to allow third-party developers to enforce tenant access to features of one or more services in a multi-tenant cloud environment provided by a cloud computing system, the method comprising:

receiving, by the cloud computing system, a copy of a config file, the config file being compatible with an extensible markup language (XML) file schema that defines an element, a child element, and an attribute;

modifying the copy of the config file to include one or more configurations for class definitions for a feature of a service in the multi-tenant cloud environment;

modifying the copy of the config file to include one or more tenant access list rules authorizing access to the feature of the service;

packaging the modified copy of the config file in a metadata archive (MAR) file, the modified copy of the config file including the one or more configurations and the one or more tenant access list rules;

delivering the MAR file to the multi-tenant cloud environment;

merging, by the cloud computing system, the config file with the modified copy of the config file to create an executable code config file having the feature of the service and the one or more tenant access list rules;

initiating the cloud computing system to restart, wherein restarting the cloud computing system causes the multi-tenant cloud environment to read the executable code config file created by merging the config file with the modified copy of the config file;

triggering the multi-tenant cloud environment to instantiate one or more objects for the feature of the service based on the class definitions and based on the one or more tenant access list rules that are read from the executable code config file upon restarting the cloud computing system;

configuring the feature of the service based on the one or more objects instantiated for the feature of the service; and automatically granting one or more tenants access to the service based on the one or more tenant access list rules in the executable code config file used to instantiate the one or more objects.

19. The method of claim 18, wherein the packaging includes packaging the modified copy of the config file in a metadata archive (MAR) file along with a shared library of class files.

* * * * *

UNITED STATES PATENT AND TRADEMARK OFFICE
CERTIFICATE OF CORRECTION

PATENT NO. : 9,495,143 B2
APPLICATION NO. : 14/032474
DATED : November 15, 2016
INVENTOR(S) : Mellor et al.

Page 1 of 1

It is certified that error appears in the above-identified patent and that said Letters Patent is hereby corrected as shown below:

In the Specification

In Column 4, Line 7, delete "the a financial" and insert -- the financial --, therefor.

In Column 4, Line 36, delete "heirarchy." and insert -- hierarchy. --, therefor.

In Column 4, Line 46, after "interfaces" insert -- . --.

In Column 6, Line 36, delete "many" and insert -- may --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*